(12) United States Patent
Nojiri et al.

(10) Patent No.: US 6,366,727 B1
(45) Date of Patent: Apr. 2, 2002

(54) LIGHT-ILLUMINATING RODS

(75) Inventors: Yukio Nojiri; Kenji Matsumoto, both of Kawaski; Shinichi Irie, Yamato, all of (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/269,953

(22) PCT Filed: Nov. 5, 1997

(86) PCT No.: PCT/US97/20257

§ 371 Date: Apr. 8, 1999

§ 102(e) Date: Apr. 8, 1999

(87) PCT Pub. No.: WO98/20279

PCT Pub. Date: May 14, 1998

(30) Foreign Application Priority Data

Nov. 7, 1996 (JP) .............................................. 8-294922

(51) Int. Cl.⁷ .............................. G02B 3/02; G02B 6/00
(52) U.S. Cl. ......................... 385/123; 385/141; 362/32
(58) Field of Search ................................ 385/123, 141, 385/142, 145, 147; 362/32

(56) References Cited

U.S. PATENT DOCUMENTS

| | | | | |
|---|---|---|---|---|
| 4,422,719 A | * | 12/1983 | Orcutt ......................... 350/96 |
| 4,460,940 A | * | 7/1984 | Mori ............................ 362/32 |
| 4,539,256 A | | 9/1985 | Shipman ................... 428/315.5 |
| 5,340,649 A | | 8/1994 | Roeker et al. ............... 428/344 |
| 5,381,526 A | | 1/1995 | Ellson ......................... 395/164 |
| 5,400,460 A | | 3/1995 | Roeker et al. ........... 15/230.12 |
| 5,416,608 A | | 5/1995 | Ueda et al. ................. 358/474 |
| 5,502,903 A | | 4/1996 | Barker ......................... 36/137 |
| 5,720,123 A | | 2/1998 | Taylor ......................... 40/454 |
| 5,731,883 A | | 3/1998 | Morton et al. ............... 358/451 |
| 5,757,550 A | | 5/1998 | Gulick, Jr. ................... 359/619 |
| 5,828,495 A | | 10/1998 | Schindler .................... 359/621 |
| 5,835,194 A | | 11/1998 | Morton ......................... 355/22 |
| 6,091,878 A | | 7/2000 | Abramowicz et al. | |
| 6,215,947 B1 | | 4/2001 | Abramowicz et al. | |

FOREIGN PATENT DOCUMENTS

| | | | |
|---|---|---|---|
| EP | 333 203 | 6/1995 | ............ G02B/6/00 |
| EP | 877 699 | 12/1998 | ........... G02B/35/24 |
| FR | 591 717 | 8/1986 | ........... F21V/13/12 |
| WO | WO 98/20279 | 5/1998 | ............. F21V/8/00 |

OTHER PUBLICATIONS

Yang, X, et al. A Low Power MEMS Silicone/Parylene Valve. Technical Digest of Solid State Sensors Actuators Workshop [online], Jun. 1998 [retrieved on Dec. 1, 2000]. Retrieved from the internet :<URL: http://touch.caltech.edu/home/publications/xing.hh98/hl.*

Silicone Rubber Right Product Inc.[online], 1997 [retrived on Dec. 1, 2000] Retrive from the Internet: <URL http://www.siliconerubber.com/Molded.html.*

* cited by examiner

*Primary Examiner*—Cassandra Spyrou
*Assistant Examiner*—Euncha Cherry
(74) *Attorney, Agent, or Firm*—Stephen W. Buckingham

(57) ABSTRACT

The present invention relates to a light-illuminating rod, and an object of the present invention is to make it possible to handle the light-illuminating rod while the rod is being deflected or install it while it is being bent. A light-illuminating rod comprising (a) a flexible rod member and (b) a light diffusible reflective film which is fixedly bonded to part of the outer periphery of the rod member along the longitudinal direction thereof and which comprises (i) a light-transmittable polymer and (ii) light diffusible reflective particles dispersed in the polymer, the light-transmittable polymer of the light diffusible reflective film having a storage modulus of $1.0 \times 10^4$ to $1.0 \times 10^8$ dyne/cm$^2$.

2 Claims, 2 Drawing Sheets

LIGHT-ILLUMINATING RODS

BACKGROUND OF THE INVENTION

The present invention relates to a light-illuminating rod, and in more detail to a light-illuminating rod comprising a rod member which is made of a flexible plastics and which can pipe the light allowed to impinge on one end thereof in the longitudinal direction toward the other end thereof, and a diffusible reflective film fixedly bonded to the surface thereof, and capable of being' advantageously utilized as a linear illuminator. The light-illuminating rod can be handled while being deflected, and it may be fixedly installed in a deflected state.

It has heretofore been known to utilize a light-illuminating rod having a rod member capable of piping light allowed to impinge on one end in the longitudinal direction, toward the other end, and a light diffusible reflective film which is fixedly bonded to the rod member to cover part of the surface thereof and which is arranged along the longitudinal direction thereof as a linear illuminator in place of a conventional illuminator such as a fluorescent lamp. In the light-illuminating rod, usually, a light source is arranged on one end of the rod member so that light is capable of impinging on the end toward the interior thereof Illumination light is then irradiated from the side surface of the rod member, which is a light-irradiating surface located opposite to the bond surface of the light diffusible reflective film, over about the whole area in the longitudinal direction thereof. Such a light-illuminating rod overcomes, for example, one of the problems that a vacuum discharge glass tube such as a fluorescent tube has, namely a problem of being easily broken.

Light-illuminating rods will be explained by making reference to Japanese Patent Publications, etc. which disclose them.

Japanese Examined Patent Publication (Kokoku) No. 4-70604 (Japanese Unexamined Patent Publication (Kokai) No. 60-11806) and Japanese Examined Patent Publication (Kokoku) No. 1-58482 (Japanese Unexamined Patent Publication (Kokai) No. 61-93409):

Relatively rigid materials such as quartz glass having a refractive index of 1.46, optical glass having a refractive index of 1.5 to 1.7 and a silicone resin having a refractive index of 1.41 are used as rod member materials of the light-illuminating rods disclosed in these Patent Publications. The light diffusible reflective film (sometimes termed diffusible film hereinafter) is prepared by dispersing fine powder (light diffusible reflective particles) having a higher refractive index than the rod member in a binder consisting of a light-transmittable polymer and mixing them. The diffusible film is placed in a stripe form on the outer periphery of the rod member along the longitudinal direction. The light-illuminating rod is used in place of a linear fluorescent tube. Accordingly, it is not intended to be used while being deflected or bent.

The rod member is solid. Fine powder of a material such as barium sulfate having a refractive index of 1.51, magnesia having a refractive index of 1.8 or titania having a refractive index of 2.6 is used as the fine powder for the diffusible film. The binder is restricted to a silicon rubber or silicone resin both having a refractive index of 1.41. That is, the refractive indexes of materials of the diffusible films disclosed herein have the following relationships: the refractive index of any of the binders is up to that of the corresponding rod member, and the refractive index of the diffusible reflective particles is higher than that of the corresponding rod member. On the other hand, when a silicone rubber is used as the binder, vulcanization is conducted to improve the heat resistance, light resistance, durability, peel resistance, etc.

Japanese Unexamined Patent Publication (Kokai) No. 62-142465, Japanese Examined Patent Publication (Kokoku) No. 7-3553 (Japanese Unexamined Patent Publication (Kokai) No. 63-108332) and Japanese Unexamined-Utility model Publication (Kokai) No. 4-104603:

The light source disclosed in the Publications each have substantially the same light-illuminating rod as disclosed in the above Publications comprising a diffusible film and a rod member, and such a unit in combination as a converging unit for enhancing the illumination efficiency (e.g., a rod lens), a reflection mirror having slits at light-irradiating portions and a diffusible reflective layer provided on the light-exiting end surface.

Japanese Unexamined Utility Model Publication (Kokai) No. 63-146803:

The light-illuminating rod disclosed in the Utility Model Publication has substantially the same rod member as disclosed in the Publications mentioned above, and a recessed portion is provided as a light diffusible portion, in parallel with the axis of the rod member on the outer periphery thereof. Light diffusible material comprising titanium dioxide and a silicone resin is placed in the recessed portion. A quantity of light reaching the -light diffusible portion thus increases, and linear illumination can be conducted with great efficiency.

Japanese Unexamined Utility Model Publication (Kokai) No. 54104:

The Utility Model Publication discloses a UV light source unit, and restricts the light impinging on the light-piping rod to UV-rays. Substantially the same material as in the Patent Publications mentioned above is used as the rod member. The diffusible film is formed from such fine powder which absorbs less light in the UV-ray wavelength region as aluminum oxide powder, and silicone resin. As a result, light generation in an irregular quantity can be prevented.

Japanese Unexamined Utility model Publication (Kokai) No. 6-21940:

The linear light source unit disclosed in the Utility Model Publication is characterized by that the rod member and the light source are integrated in a stick form. A rod member made of polymethyl methacrylate (PMMA) is disclosed therein, and acrylic resin is mentioned as an appropriate binder for the diffusible film for the rod member. However, the rod member made of PMMA and used for the light source unit has a poor flexibility. Accordingly, the light source unit can be used only for restricted applications such as copying machines. Moreover, the Utility Model Publication discloses no detail related to the acrylic resin as a binder. In addition, the glass transition temperature (Tg) of the PMMA used in the rod member is approximately 100° C.

As illustrated above, light-illuminating rods of various types have been known. However, rod members used as the cores of conventional light-illuminating rods have no flexibility at all, or have a flexibility not sufficient for handling while being deflected or installing while being in a bent state. Accordingly, there is no such a case where diffusible films Used in combination with the rod members are improved so that the diffusible films can follow the deflection of the rod members. For example, when a vulcanized rubber is used as a binder of the diffusible films, the vulcanized rubber usually has a relatively high Young's modulus of about $10^8$ dyne/cm$^2$ (about 100 Mpa). As a result, a bonded diffusible film formed from the vulcanized rubber has relatively poor follow-up properties in accordance with the deflection of the rod members. The light-illuminating rods in which acrylic plastics-containing flexible rod members are used and which have been put to practical use in recent years may be handled while being deflected or fixedly installed while being bent. The conventional diffusible films as mentioned above, however, are not satisfactory in respect to adhesion to the flexible rod members and flexibility.

An object of the present invention is to solve the problems associated with the prior art as mentioned above, and improve the adhesion and flexibility of the diffusible film in the light-illuminating rod capable of being used as a linear illuminator so that the rod may be handled while being deflected and fixedly installed while being bent.

SUMMARY OF THE INVENTION

According to the present-invention, the object as mentioned above can be achieved as described below. In a light-illuminating rod comprising (a) a flexible rod member formed from a light-piping plastic material and (b) a light diffilsible reflective film which is fixedly bonded to part of the outer periphery of the rod member along the longitudinal direction thereof and which comprises (i) a light-transmittable polymer and (–ii) light diffusible reflective particles dispersed in the polymer, said light diffusible reflective film is formed by using a light-transmittable polymer having a storage modulus of $1.0 \times 10^4$ to $1.0 \times 10^8$ dyne/cm$^2$ as measured by a viscoelastic spectrometer.

In the light-illuminating rod of the present invention, the light diffusible reflective film is fixedly bonded to the surface of a flexible rod member forming the core of the rod, and the light diffusible reflective film is formed from a composition prepared by dispersing light diffusible reflective particles in the light-transmittable polymer having a storage modulus of $1.0 \times 10^4$ to $1.0 \times 10^8$ dyne/cm$^2$ and mixing them. As a result, the adhesion and flexibility of the diffusible film are improved, and consequently the follow-up properties of the diffusible film in accordance with the deflection of the rod member are improved.

DESCRIPTION OF REFERENCE NUMERALS

Figure 1:
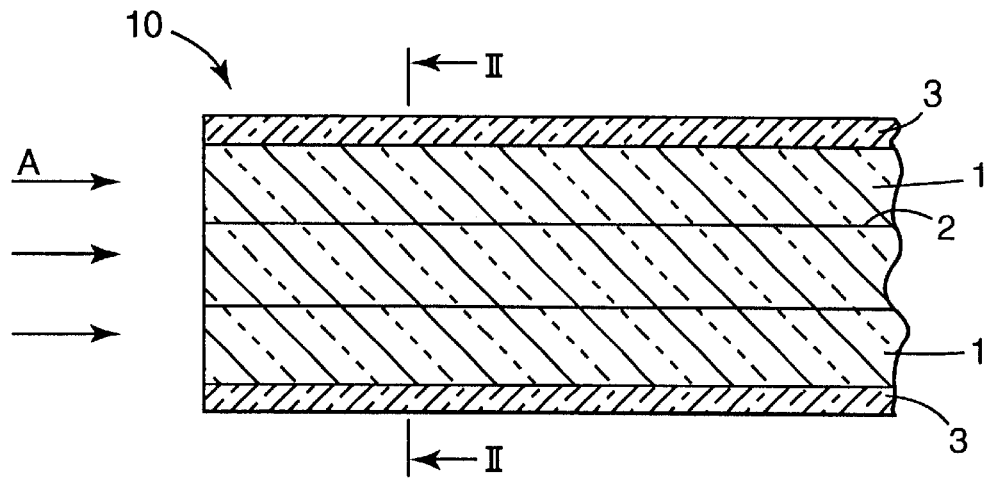
FIG. 1 is a cross-sectional view in the longitudinal direction showing a preferred embodiment of a light-illuminating rod according to the present invention.

1—rod member
2—light diffusible reflective film (diffusible film)
3—clad layer
10—light-illuminating rod

DETAILED DESCRIPTION OF THE INVENTION

The light-illuminating rod according to the present invention can be practiced in various preferred modes. These modes of operation are illustrated below, but it should be construed that the invention is in no way limited to the modes described below.

I. Flexible Rod Member

A flexible rod member is used as a core extended in the longitudinal direction of the light-illuminating rod of the present invention. The rod member is formed from a light-piping plastic material having transparency to such a degree that the rod member is capable of piping light, which impinges on one end thereof, toward the other end thereof. Although the rod member may have various preferred forms, it preferably has the form of a solid rod made of flexible plastics, that of a hollow rod made of flexible plastics, that of a material-sealed hollow rod such as a tube in which a material, preferably a liquid material, having a relatively high refractive index, e.g. silicone gel is sealed, or the like form. When-the rod member is in the form of a hollow tube in which a liquid material is sealed, the plastic tube preferably has a refractive index equal to or greater than that of the liquid.

The plastic material used herein is preferably made of such a polymer having light-transmittable properties and flexibility as acrylic polymer, polymethylpentene, ethylene-vinyl acetate copolymer, plasticized polyvinyl chloride and vinyl acetate-vinyl chloride copolymer. Moreover, the refractive index of such a plastic material is usually from 1.4 to 1.7, and the total transmittance of light beam is usually at least 80%. Moreover, such a polymer may be crosslinked to ensure a sufficient heat resistance in accordance with the deflection of the rod member itself.

The flexible rod member can be produced by conventional procedures. For example, an acrylic solid rod member-can be advantageously produced as described below.

First, one or at least one acrylic monomer which is a starting material of the rod member is filled in a tube which extends in the longitudinal-direction and which has at least one open end. The monomer filled therein is preferably held, prior to reaction, at low temperature sufficient for preventing undesired prereaction. Thereafter, the contents of the tube is consecutively heated to at least the reaction temperature of the monomer so that the reaction of the monomer filled therein consecutively starts from the one end thereof toward the open end. That is, the heating portion is not fixed, but moved from the one end toward the open end. The moving speed of the heating portion is usually from 10 to 100 cm/hour. It is preferable that the reaction be conducted while the monomer is being pressurized. Furthermore, after the completion of heating toward the open end, the entire tube is preferably heated further for several hours so that the reaction is completely finished.

Examples of preferred components and preferred amounts of the acrylic monomers used as the starting materials in the production mentioned above are as follows:

(i) from 10 to 80 parts by weight of a (meth)acrylate the homopolymer of which has Tg higher than 0° C.;

(ii) from 10 to 80 parts by weight of a (meth)acrylate the homopolymer of which has Tg less than 0° C.;

(iii) from 1 to 80 parts by weight of a crosslinking agent which is added if necessary.

Concrete examples of(i) the (meth)acrylate the homopolymer of which has Tg higher than 0° C. are n-butyl methacrylate, methyl methacrylate, methyl acrylate, 2-hydroxyethyl methacrylate, n-propyl methacrylate, phenyl methacrylate, and the like. Moreover, concrete-examples of (ii) the (meth)acrylate the homopolymer of which has Tg of less than 0° C. are 2-ethylhexyl methacrylate, ethyl acrylate, tridecyl methacylate., dodecyl methacrylate, and the like. The mixing ratio by weight of (i) the (meth)acrylate (H) to (ii) the (meth)acrylate (L) (H:L) is preferably from 15:85 to 80:20, particularly preferably from 20:80 to 70:30. When the content of (i) the (meth)acrylate is too low, the mechanical strength may lower. Conversely, when the content of (i) the (meth)acrylate is excessive, the flexibility may not be made good.

Examples of (iii) the crosslinking agent are polyfunctional monomers such as diallyl phthalate, triethylene glycol di(meth)acrylate and diethylene glycol bis(allyl carbonate).

When the rod member is produced as described above, the polymer of the rod member thus obtained has a uniform composition from one end to the other end in the longitudinal direction thereof. Accordingly, the good light-piping properties of the rod member and the mechanical strength thereof sufficient for the deflection thereof can be ensured. The storage modulus, which is a storage shear modulus measured with a viscoelastic spectrometer by a procedure to be described later, of the rod member is preferably from $1.0 \times 10^6$ to $1.0 \times 10^9$ dyne/cm². When the rod member has a storage modulus of less than $1.0 \times 10^6$ dyne/cm², the mechanical-strength and heat resistance may be deteriorated. When the rod member has a storage modulus exceeding $1.0 \times 10^9$ dyne/cm², the flexibility may become insufficient.

Furthermore, although there is no specific limitation to the tubes used in the production method, tubes made of a fluoro polymer such as a tetrafluoroethylene-hexafluoropropylene copolymer (FEP) are preferred. In addition, for the detail of the production method of such flexible rod members, refer to the Japanese Patent KOKAI Publication No. 63-19604.

The length of the rod members is usually from 20 cm to 10 m, preferably from 30 cm to 5 m, particularly preferably from 35 cm to I m though it depends on the mode of the use of the light-illuminating rods. When the rod member is too short, the flexibility tends to lower. Conversely, when light impinges only on one end of the rod member which is too long, the irradiation amount of the light near the other end may lower, that is, the illuminance of the rod member as an illuminator may lower.

Furthermore, the rod member may have any shape of its cross-section in the width direction so long as the effect of the present invention is not marred. Examples of the preferred shape are such a one capable of maintaining the flexibility of the rod member as a circle, an ellipse, a semicircle and a segment having an area larger than the semicircle.

Although the diameter of the rod member may be broadly changed when the rod member has a circular cross-section, it is usually in the range of 5 to 30 mm.

II. Light Diffusible Reflective Film

In the light-illuminating rod of the present invention, a light diffusible reflective film (also referred to—as diffusible film herein) is used in combination with a flexible rod member used as a core. As described above, the light diffusible reflective film is closely bonded to part of the outer periphery of the rod member along the longitudinal direction, and comprises a light-transmittable polymer and light diffusible reflective particles dispersed therein.

Light-transmittable Polymer:

The major component of the diffusible film is the light-transmittable polymer. The light-transmittable polymer has a storage modulus, which is measured with a viscoelastic spectrometer by a method to be described later, of $1.0 \times 10^4$–$1.0 \times 10^8$ dyne/cm², preferably $1.0 \times 10^5$–$5.0 \times 10^7$ dyne/cm². When the light-transmittable polymer has a storage modulus much greater than $1.0 \times 10^8$ dyne/cm², the diffusible film cannot follow the deflection of the rod member, and is peeled or damaged- Conversely, when the light-transmittable polymer has a storage modulus much less than $1.0 \times 10^4$ dyne/cm², the repeated deflection of the rod member plastically deforms the diffusible film. As a result, it becomes difficult to maintain the designed shape and dimension thereof.

Although the content of the light-transmittable polymer in the diffusible film may be broadly changed, the polymer is used usually in air amount of 5 to 10,000 parts by weight, appropriately 10 to 2,000 parts by weight based on 100 parts by weight of the light diffusible reflective particles which are used in combination therewith. When the content of the light-transmittable polymer is less than 5 parts by weight, the adhesion and flexibility of the diffusible film may lower. Conversely, when the content of the light-transmittable polymer exceeds 10,000 parts by weight, the illuminance of the light-illuminating rod tends to lower.

Suitable examples of the light-transmittable polymer include acrylic polymer, fluorine-containing polymer, polyvinyl chloride, polyolefin, polystyrene, polyurethane, polyester, silicone type polymer, and the like. These polymers may be used in the form of homopolymers or copolymers. Preferred examples of copolymers are styrene-acrylonitrile copolymer, alkyl acrylate-styrene copolymer, vinyl chloride-vinyl acetate copolymer, ethylene-vinyl acetate copolymer, styrene-butadiene copolymer, styrene-isoprene copolymer, polypropylene-maleic acid copolymer, alkyl acrylate-acrylic acid copolymer, and the like. The copolymers may be either two-component system copolymers, or three-component system copolymers, or copolymers of more components.

The light-transmittable polymer to be used will be further illustrated. The weight average molecular weight of the polymer is usually from 5,000 to 1,000,000.

Moreover, the total transmittance of light beam thereof is usually at least 70%, preferably at least 80%, particularly preferably at least 90%. The light-transmittable polymer may be crosslinked so long as it has a storage modulus in the range mentioned above.

Furthermore, the refractive-index of the light-transmittable polymer n(P) is preferably about equal to or greater than the refractive index of the rod member n(R). When the refractive index of the light-transmittable polymer satisfy the condition, light is easily guided from the bond area between the diffusible film and the rod member into the diffusible film, and the intensity of illumination from the light-irradiating surface of the rod member can be effectively improved. However, when the difference between the refractive indexes n(P) and n(R) is too large, the intensity of the diffusion reflection becomes too large, and sufficient illuminance may not be obtained over the entire area in the longitudinal direction. It can be concluded from the standpoint as described above that the difference between the refractive indexes n(P) and n(R), namely $\Delta n_1 = n(P) - n(R)$, is preferably from −0.10 to 1.00, particularly preferably from −0.05 to 0.5.

Such chemical structures improving the refractive index of substances as aromatic rings, aliphatic rings, hetero rings, halogen atoms other than fluorine atoms and sulfur atoms are usefully introduced into the light-transmittable polymer to improve the refractive index thereof. For example, in the case of an acrylic polymer, monomer components are copolymerized, the components containing such an acrylic monomer the homopolymer of which has a refractive index of at least 1.5 as phenyl methacrylate, phenoxyethyl acrylate and pentabromophenyl methacrylate. In the case of polyurethane, a polyurethane synthesized with an aromatic diisocyanate is used.

Colloid of such a metal oxide having a refractive index of at least 1.6 as antimony pentoxide may also be dispersed in and mixed with the light-transmittable polymer to improve the refractive index thereof. A surface treating agent such as a silane coupling agent is preferably used to improve the dispersibility of the metal oxide colloid.

Light Diffusible Reflective Particles:

In the light diffusible reflective film of the present invention, it is essential that light diffusible reflective particles be dispersed in the light-transmittable polymer. "Light diffusible reflective particles" used herein in the specification of the present invention are defined to be particles which have an average particle size of usually from 0.1 to 10 µm and a refractive index n(D) different from that of the light-transmittable polymer n(P), and which, in a state of being dispersed in the light-transmittable polymer and contained in the light diffusible film, act to diffusion reflect the light having passed the bond area between the rod member and the diffusible film and having been guided into the diffusible film so that the light is returned to the rod member. At least part of the light having been diffusion reflected is externally irradiated from the light-irradiating surface of the same rod member located opposite to the bond area of the rod member, and it becomes possible to illuminate from the entire area where the diffusible film is provided along the longitudinal direction thereof.

The absolute value of the difference between the refractive index of the light-transmittable polymer n(P) and the refractive index n(D) is usually at least 0.01, preferably from 0.02 to 1.50, particularly preferably from 0.10 to 1.40. When the absolute value of the difference between the refractive indexes is too small, the shielding properties of the diffusible film may become poor, and the diffusion reflection intensity may be lowered. Conversely, when the absolute value of the difference between the refractive indexes becomes too large, the following problems may arise: the intensity-of the diffusion, reflection intensity becomes too large; the illuminance becomes high only near the light-impinging end, and illumination with sufficient illuminance along the entire longitudinal direction may not be effected.

The light diffusible reflective particles may be either inorganic substance or organic substance so long as desired effects are achieved. Moreover, the light diffusible reflective particles may be in any of forms such as powder, fine spheres, gas bubbles and droplets.

In general, the refractive index of the light diffusible reflective particles n(D) is preferably larger than that of the rod member n(R) by a difference of 0.01 to 1.50. In particular, when the refractive index of the light-transmittable polymer n(P) is up to the refractive index n (R), the diffusible film containing the light diffusible reflective particles having a refractive index higher than that of the rod member-makes it easy to guide light from the bond area between the rod member and the diffusible film into the diffusible film, and effectively improves the illumination intensity from the light-irradiating surface of the rod member. However, when the difference between the refractive index n(D) and the refractive index n(R) becomes too large, the diffusion reflection intensity becomes too strong, and sufficient illuminance over the entire area along the longitudinal direction may not be obtained. In such a situation, inorganic powder having a refractive index of 1.5 to 3.0 is preferred as an example of the light diffusible reflective particles. There are readily available inorganic powders which have both a refractive index higher than that of the plastic material forming the rod member and an average particle size effective for the light diffusible reflective particles.

On the other hand, when the refractive index of the light-transmittable polymer n(P) is larger than the refractive index of the light diffusible reflective particles n(D), the refractive index of the light diffusible reflective particles n(D) may be about equal to or less than the refractive index n(R), or the refractive index n(D) is preferred to be less than the refractive index n(R) by a difference of at least 0.01. The diffusion reflection intensity is then effectively prevented from becoming too strong, and illumination with sufficient illuminance over the entire area along longitudinal direction becomes easy. Examples of such particles having a relatively low refractive index are mica, hollow spheres of glass or polymer, gas bubbles, silica, and the like. Moreover, materials such as pearl pigments and metal powder having a high reflectance on the particle surface may also be used as light diffusible reflective particles. Adhesive polymer:

The diffusible film preferably contains the adhesive polymer. The adhesive polymer effectively increases the adhesion and flexibility of the diffusible film, and significantly improves the follow-up properties in accordance with the deflection of the rod member. The "adhesive polymer" herein is defined to be a polymer having adhesiveness at room temperature, and has a storage modulus, the measurement method of which will be explained in detail, of usually from $1.0 \times 10^4$ to $1.0 \times 10^7$ dyne/cm$^2$. Examples of the preferred adhesive polymer are acrylic polymer, silicone type polymer, rubber type polymer, polyolefin or polyurethane though they are not restricted to the polymers mentioned above. The acrylic polymer is particularly preferred because it has excellent weather resistance and light resistance.

The content of the adhesive polymer in the diffusible film is usually from 10 to 100% by weight based on the entire light-transmittable polymer. When the content is less than 10% by weight, the effect mentioned above may be lowered. The content of the adhesive polymer is preferably at least 15% by weight, particularly preferably at least 20% by weight.

Dispersible Polymer:

The dispersible polymer preferably contains further a dispersible polymer together with the light-transmittable polymer and the adhesive polymer. The dispersible polymer simultaneously enhances the dispersibility of inorganic powder used as the light diffusible reflective particles and the film-forming ability of the light-transmittable polymer. That is, the combination of the inorganic powder and the dispersible polymer enhances the mechanical strength of the diffusible film, effectively prevents the plastic deformation of the diffusible film, effectively increases the packing of the light diffusible reflective particles, and improves the shielding properties of the diffusible film. The dispersible polymer used in the present invention is preferably a polymer having hydrophilic functional groups within the molecule. Concrete examples of the hydrophilic functional group are sulfonic acid, sulfonic acid salt, phosphoric acid, phosphoric acid ester, phosphoric acid salt, carboxylic acid, amino group, quaternary ammonium salt, carbobetaine, sulfobetaine, hydroxyl group, and the like.

When the dispersible polymer is used in the present invention, it is preferably used in an amount of 2 to 90% by weight based on the total amount of the light-transmittable polymer. Moreover, when the dispersible polymer is used in combination with inorganic powder as the light diffusible reflective particles as described above, the inorganic powder is preferably used in amount of 10 to 100% by weight based on the total amount of the light diffusible reflective particles.

The mixing ratio of the adhesive polymer (A) to the dispersible polymer (W) (ratio by weight of A:W) is preferably from 10:90 to 98:2. When the content of the adhesive polymer is too small, the effect of increasing the adhesion of the diffusible film is marred. Conversely, when the content of the adhesive polymer is increased and the amount of the dispersible polymer is decreased, the effect of enhancing the dispersibility of the inorganic powder is marred. Formation of the diffusible film:

The diffusible film can be formed from the film-forming components as mentioned above and from other components if necessary by a procedure for forming a conventional film or coating. For example, a mixture containing a light-transmittable polymer, light diffusible reflective particles and a solvent is dispersed with a dispersing apparatus to give a paint. The outer periphery of the rod member is directly coated with the paint, and dried to form the diffusible film. In the preparation of the paint, examples of conventional dispersing apparatuses and kneading apparatuses are a paint shaker (vibrating apparatus), a sand mill, a kneader, a roll mill, a planetary mixer, and the like. Examples of the coating apparatuses are a roll coater, a knife coater, a bar coater, a die coater, and the like.

When the light-transmittable polymer contains the adhesive polymer, the diffusible film can be formed by coating a release film with the paint on the release surface, solidifying, curing, drying, etc. to give a coating film, bonding the film to the outer periphery of the rod member, and removing the release film, namely transferring the coating film. The coating film thus obtained may function as an adhesive film for forming the diffusible film of transfer type. In this case, the adhesiveness of the film can be enhanced by heating and/or pressurizing the diffusible film after or during transfer operation. Moreover, the coating film may not be used as a transfer type, but it may also be used as an adhesive film with a substrate replacing the release film with a substrate made of a flexible polymer, and fixedly bonding the coating film and the substrate. The flexible polymer has a storage modulus of usually $1.0 \times 10^4$ to $1.0 \times 10^8$ dyne/cm$^2$ and a breaking extension of usually 100 to 1,000%. Although there is no specific limitation on the thickness of the flexible substrate so long as—the substrate does not lose its flexibility, it is usually from 5 to 500 μm.

Furthermore, the diffusible film containing an adhesive polymer may also be formed by dispersing the light diffusible reflective particles in monomer components which are to form the adhesive polymer after polymerization to give a paint, applying the paint to form a coating film, and subsequently polymerizing the monomer components., In this case, the diffusible film may be formed by subjecting the coating film directly provided on the rod member surface to polymerization, or the adhesive film of transfer type may also be formed by subjecting the coating film on a release film to polymerization. The method of using monomer can make dispersion operation of the light diffusible reflective particles easy. Polymerization of the monomer can be conducted by photopolymerization, electron beam polymerization, thermal polymerization, etc. Moreover, the paint may also be prepared by adding such monomer as mentioned above to a predispersion containing the dispersible polymer and the light diffusible reflective particles.

Furthermore, the diffusible film may also be formed by bonding the coating film containing the light diffusible reflective film to the outer periphery of the rod member through a light-transmittable adhesive. The adhesive polymer mentioned above may be used as the light-transmittable adhesive with or without modification. For example, a coating film layer containing the light diffusible reflective particles and the light-transmittable polymer and a layer of the light-transmittable adhesive are consecutively laminated in this order to a release film to give an adhesive film for forming the diffusible film of transfer type having a double layer-structure. Using the adhesive film, the diffusible film can be transferred and bonded to the outer periphery of the rod member. In this case, a difference between the-refractive index of the light-transmittable adhesive n(A) and the refractive index of the rod member n(R) $\Delta n_2 = n(A) - n(R)$ is at least −0.3. When the refractive index of the light-transmittable adhesive is too small, sufficient illuminance may not be obtained. Conversely, when the refractive index thereof is too large, the diffusion reflection intensity becomes too large, and sufficient illuminance may not be obtained over the entire area along the longitudinal direction. It can be concluded from such a standpoint that the difference between the refractive indexes $\Delta n_2$ is preferably from −0.25 to 1.00, particularly preferably from −0.20 to 0.5. Moreover, the light-transmittable adhesive has a storage modulus of usually $1.0 \times 10^4$ to $1.0 \times 10^7$ dyne/cm$^2$. The method of using such a light-transmittable adhesive is effective in further improving the adhesion of the diffusible film.

The thickness of the entire diffusible film is usually from 1 to 2,000 μm, preferably from 5 to 1,000 μm, particularly preferably from 10 to 800 μm. When the diffusible film to be used is too thin, the reflection efficiency thereof may be lowered, and the illuminance may be lowered. When the diffusible film is too thick on the contrary, the flexibility may be lowered.

The width of the diffusible film. (dimension in the direction transverse to the longitudinal direction) is usually from 1 to 35 mm, preferably from 2 to 30 mm, particularly preferably from 3 to 20 mm, though it depends on the diameter of the rod member to which the diffusible film is to be bonded.

The diffusible film is preferably arranged along the longitudinal direction of the rod member, and is preferably in the form of one or at least two stripes. The diffusible film may be continuously provided along the longitudinal direction of the rod member, or it may be discontinuously provided. When the diffusible film is provided discontinuously, the dimensions of the thus divided diffusible films in the longitudinal direction may be made different among them. However, the preferred arrangement of the diffusible films is a so-called equally spaced bar code-like arrangement as described below. A plurality of diffusible films which have approximately the same dimension in the longitudinal direction and are long in-the width direction, preferably many diffusible films in fine stripes are arranged at approximately equal intervals. As a result, the adhesion of the diffusible films (fine stripes) can be easily maintained when the rod member is deflected. Such bar code-like diffusible films may be provided by directly print them on the surface of the rod member. Similar effects may be achieved by diffusible films formed by printing in a dot form.

When the shielding properties of the diffusible film itself is relatively poor, the amount of light diffusion reflected toward the light-irradiating surface which is located on the outer periphery of the rod member decreases. in such a case, a reflecting film may be applied to the surface of the diffusible film, namely the surface opposite to the one closely bonded to the rod member, to prevent the decrease in illuminance opaque white films, deposited metal films, metal foil, recurrence reflecting materials, and the like may be utilized as the reflecting films. The diffusion reflectivity may also be enhanced by surface roughening the reflecting film surface contacted with the diffusible film. Moreover, the reflecting film preferably has sufficient flexibility so that it may also function as the flexible substrate.

Furthermore, the diffusible film may contain various additives in addition to the materials mentioned above so long as the effect of the present invention is not marred. Examples of the suitable additive are UV absorbers, thermal stabilizers, surfactants, plasticizers, antioxidants, mildew-proofing agents, colorants, luminous materials, tackifiers, and the like. Fluorescent dyes and pigments can be used as the colorant in addition to conventional pigments and dyes.

III. Clad Layer

The light-illuminating rod of the present invention may have a clad layer which covers the rod member and the diffusible film with which the outer periphery thereof is coated, as conventionally conducted in the technical field. The clad layer is effective in protecting the surface of the rod member and the diffusible film from contamination, etc., and preventing the damage of them. Although there is no specific limitation on substances suitable for forming the clad layer, examples of them are ethylene-hexafluoropropylene, tetrafluoroethylene-hexafluoropropylene-vinylidene fluoride, trifluoroethylene-vinylidene fluoride, polymethylpentene, ethylene-vinyl acetate copolymer, vinyl acetate-vinyl chloride copolymer, and the like. Furthermore, although the thickness of the clad layer may be broadly changed, the thickness is usually from I to 2,000 $\mu$m.

IV. Application of the Light-illuminating Rod

The light-illuminating rod of the present invention can be advantageously utilized as a linear illuminator in various fields. For example, the light-illuminating rod of the present invention is used, in combination with a light source, as an illuminator as described below.

The light-illuminating rod is installed at a site where an illuminator is to be installed and a light source is arranged so that light impinges on at least one end thereof in the longitudinal direction and enters the rod. That is, when the illuminator is compared with a conventional fluorescent lamp, the light-illuminating rod is arranged at the site where the fluorescent tube-is to be arranged. In the arrangement method -utilizing the characteristics of the present invention, it is preferred that the light-illuminating rod be arranged along the installing plane such as a wall having a curved surface, or that the rod be fixedly installed while being bent in the longitudinal direction. Moreover, the light-illuminating rod can be handled by deflecting it when it is to be sectioned to have a desired length or when it is to be arranged at a desired site, the handling operation of it thus being improved.

A high luminance lamp such as a xenon lamp, a halogen lamp and a flash lamp can be advantageously used as the', light source. The power consumption of these lamps is usually from 10 to 500 W. Light from a light source can be allowed to impinge on the rod member, for example, by arranging one end of the rod member, which is extended so that its length is longer than that actually used for illumination, at the site near the light source. For the purpose of effectively utilizing light from the light source in this case, it is preferred that the light source be arranged within a suitable box, and that a reflecting member be provided for the light source.

Furthermore, two light sources may also be employed so that light is allowed to impinge on both ends of the rod member. In another procedure, light piped from one end of the rod member and reaching the other end thereof is reflected by a reflecting member arranged at the other end, and the intensity of illumination from the light-illuminating surface can thus be effectively enhanced. In this case, the reflection at the reflecting member may be either mirror reflection or diffusion reflection.

In addition, spotting illumination, i.e., downlight illumination may be carried out in several sites by using one light-illuminating rod in accordance with the below-mentioned manner. Namely, a longitudinally extending light-illuminating rod is disposed along a front or back surface of the ceiling, and in the light-illuminating rod, a diffusible film is partially applied onto a rod member in the portions at which the spotted illuminating light should be irradiated. When the light-illuminating rod is disposed on a back surface of the ceiling, an opening for illumination is provided in-the ceiling. For example, when openings for spotting illumination are disposed in a distance of about 2 m in one and same direction in the ceiling, the rod elements is continuously disposed along said direction in the back surface of the ceiling, and the diffusible films having a predetermined length are discontinuously applied in a distance of about 2 m to the rod element along with a longitudinal direction thereof In this case, since substantially all of the no light is substantially irradiated in the areas having no diffusible film of the rod member, a loss in the light transmission can be prevented in the longitudinal direction of the rod member, and thus the spotted illumination can be effectively attained only in the areas having the diffusible film of the rod member. The length of the diffusible films (their size along the longitudinal direction of the rod member) can be varied depending upon the illuminating area, however, generally, it is a range of 5 to 50 cm. Further, if desired, two or more light-illuminating rods may be disposed in parallel.

When the light-illuminating rod is used, it is preferred that the outer periphery of the rod member be covered with a clad layer containing fluoro polymer, etc. as described above, and that the rod member be covered with a protective material such as a metallic jacket having an opening at the site corresponding to the light-irradiating surface. Moreover, an illuminator may also be formed using the light-illuminating rod in combination with parts such as a reflector and a light-shielding plate used in a conventional fluorescent lamp.

Since luminescence by vacuum discharge, for example, by a fluorescent tube involves a relatively large amount of heat generation, the luminescence is not suitable for illuminators used within refrigerators such as refrigeration show cases and freeze show cases. The light-illuminating rod of the present invention can solve such a problem of heat generation, and may be used as cool light illumination. That is, the light source which tends to have a relatively high temperature is arranged outside the cold room of the refrigerator and the light-illuminating rod alone is arranged within the cold room.

On the other hand, when the light-illuminating rod of the present invention is used as an exterior illuminator such as an advertisement sign lamp, there is no fear of the damage thereof caused by weather or the collision of flying materials. Moreover, the light-illuminating rod can be advantageously used for the display of characters, designs, etc. as described below. That is, a display including a curve may be made using only one light-illuminating rod of the present invention, whereas the display is difficult to be made using only one fluorescent tube.

EMBODIMENTS

The present invention will be illustrated in more detail by making reference to examples.

Example 1

To prepare a paint for forming a diffusible film, a mixture of the following components (a), (b) and (c):

(a) monomer components comprising 65 parts by weight of 2-ethylhexyl acrylate (2EHA), 30 parts by weight of phenoxyethyl acrylate (PEA) and 5 parts by weight of acrylic acid (AA), b) 0.1 part by weight of a photopolymerization initiator (trade name of Irgacure 1700, manufactured by Ciba Geigy), and (c) 50 parts by weight of titanium oxide powder (article No. of A-100, manufactured by Ishihara Sangyo Kaisha Ltd.) was placed in a vessel, and shaken for about 3 minutes to disperse titanium oxide (light diffusible reflective particles) in the monomer components. In addition, titanium oxide used herein had an average particle size of about 0.15 to 0.25 $\mu$m and a refractive index of 2.6.

The paint thus prepared was held between two silicone-treated release PET films with the treated surfaces contacted with the paint, and a coating film having a uniform thickness was formed using a knife coater. After forming the coating film, the monomer components were polymerized by irradiating UV-rays so that the coating film was cured. An adhesive film for forming a diffusible film of transfer type was thus formed. The UV-ray irradiation was performed using a High Voltage Mercury Lamp UV-ray Irradiating Apparatus (trade name, manufactured by Ushio Inc.) while the intensity was being maintained at 1,035 mJ/cm$^2$ measured with an integrating meter for UV-ray irradiation quantity (Article No. of ORC UV-350, manufactured by ORC Seisakusho K.K.) with a maximum sensitive wavelength of 350 nm. The PET film had a thickness of about 50 $\mu$m, and the coating film (adhesive film capable of being transferred) subsequent to curing had a thickness of 30 $\mu$m. The ratio by weight of the light diffusible reflective particles (D) to the light-transmittable polymer (P) (D:P) was 100:200. The light-transmittable polymer (which is also an adhesive polymer) made of the polymer of the monomer-components mentioned above had a refractive index of 1.49 and a storage modulus of 7.00×10$^5$ dyne/cm$^2$.

Methods for measuring the refractive index and the storage modulus of polymers such as light-transmittable polymers, adhesive polymers, dispersible polymers and light-transmittable adhesives are illustrated below. The refractive index of a polymer was measured at 25° C. with Na-D-line (wavelength of 589 nm) using an Abbe refractometer. Measurements of storage moduli (shear storage moduli) of rotation mode were made at 25° C. at a frequency of 1 rad/sec on samples of polymers formed in cylinders each having a diameter of 7.9 mm and a height of 3 to 5 mm using an apparatus for measuring dynamic modulus of viscoelasticity (viscoelastic spectrometer) (article No. of RDA-II, manufactured by Rheometrics).

The adhesive film of transfer type formed as mentioned above was slit to give a tape having a width of 4 mm. One side of the PET film was peeled, and the remaining adhesive film was applied to the outer periphery of a rod member having a length of 1 m along the longitudinal direction. The adhesive film was contact bonded thereto by pressing from the back surface of the remaining other PET film. The PET film was then peeled, and the adhesive film was transferred. A light-illuminating rod having a diffusible film fixedly bonded to the outer, periphery of the rod member was thus obtained. In addition, a protective jacket and a clad layer were removed from an optical fiber (article No. of EL-500, manufactured by Lumenyte) having a diameter of 12 mm to obtain a core portion. The core portion was used as the rod member. The core was made of a relatively flexible acrylic polymer, and had a storage modulus of 3.94×10$^7$ dyne/cm$^2$ and a refractive index of 1.49.

Using the light-illuminating rod, the adhesion and flexibility of the diffusible film were evaluated as follows: the rod was repeatedly bent at its center with hands to make an angle of about 90° ten times, and evaluated to be good when neither peeling nor crack formation on the diffusible film was observed, or evaluated to be no good when peeling or crack formation thereon was observed. The adhesion and flexibility of the diffusible film in this example were both judged to be good.

Figure 2:
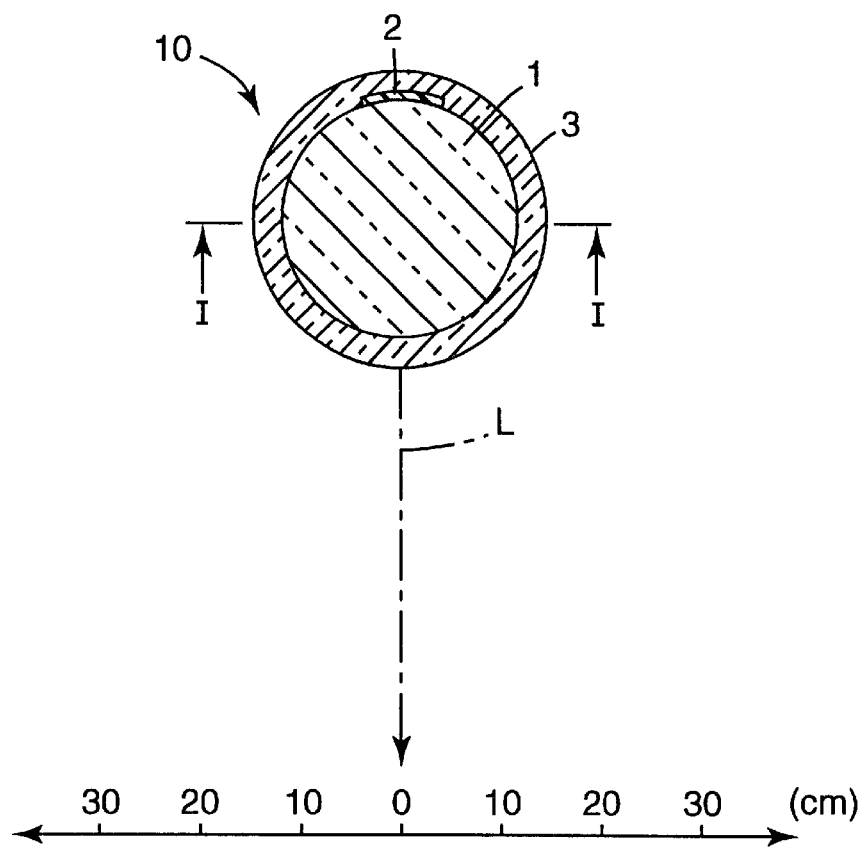
FIG. 2 is a cross-sectional view along the line II—II of the light illuminating rod in FIG. 1.

Furthermore, the light-illuminating rod thus prepared was covered with a heat-shrinkable polytetrafluoroethylene-hexafluoropypylene (FEP) tube (trade name of FEP-120 manufactured by Flon Kogyo K.K.) to give a light-illuminating rod of clad covering type as shown in FIG. 1 and FIG. 2. FIG. 1 shows a cross-sectional view in the longitudinal direction (in the line I—I in FIG. 2) of the light-illuminating rod thus prepared provided that FIG. 2 also shows the light diffusible reflective film (diffusible film) 2 in a stripe shape formed on the outer periphery of the rod member for illustration. As understood from FIG. 1 and FIG. 2 which is a cross-section along the line II—II in FIG. 1, the light-illuminating rod 10 has a clad layer 3 as a covering of the rod member 1. As shown in FIG. 1, light from a light source (not shown) impinges on one end of the light-illuminating rod 10 as shown by arrows A, and is piped within the rod member 1. The light is also irradiated outside the rod member 1 as shown by an arrow L in FIG. 2 by the light diffusion and the reflection of the diffusible film 2 fixedly bonded to the outer periphery of the rod member 1. The surface portion of the outer periphery of the rod member 1 which portion irradiates light as described above is termed a light-irradiating surface in the specification of the present invention.

Figure 3:
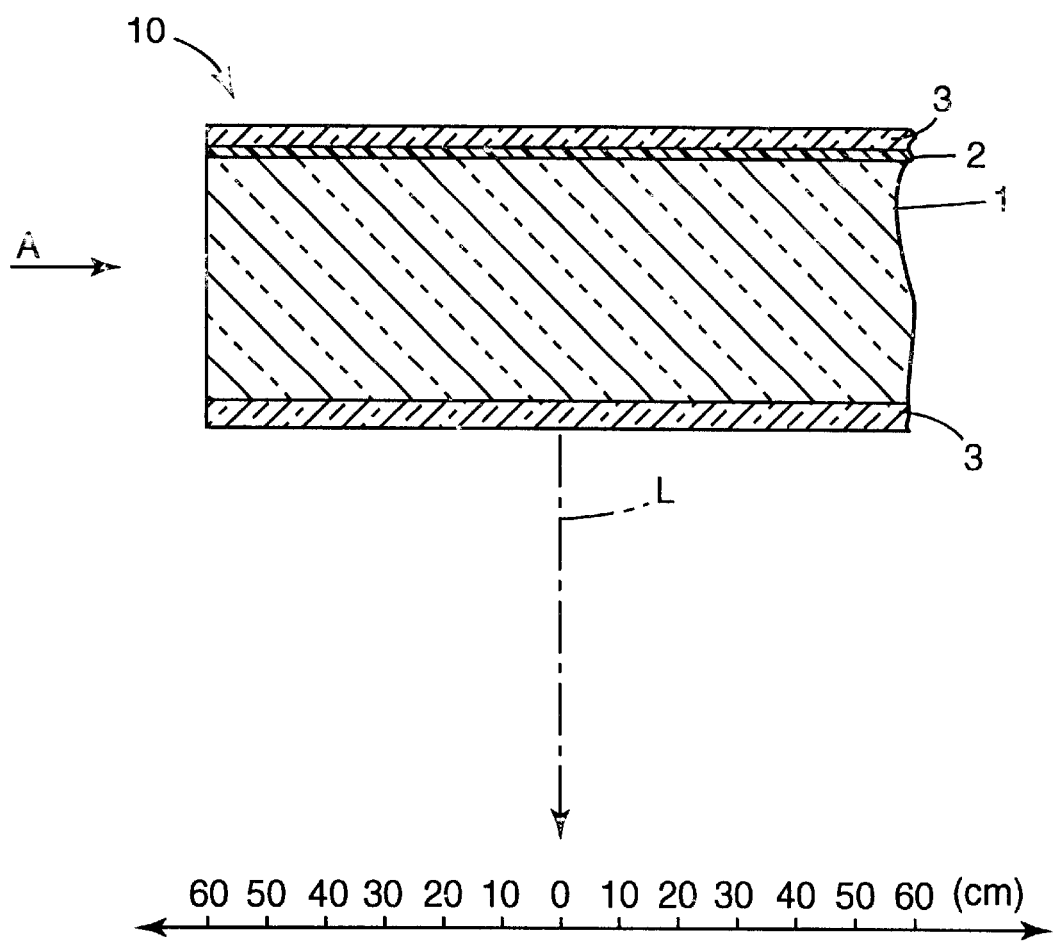
FIG. 3 is a cross-sectional view illustrating the measurement of illuminance.

Using the light-illuminating rod of clad covering type thus prepared, the illuminance was measured by a procedure illustrated in FIG. 3. As shown in FIG. 3, light sources (not shown) were arranged so that light A and light B impinged on both ends of the light-illuminating rod 10 and entered the interior thereof to give an illuminator. Two light source units each having a halogen lamp (30 W) with a reflection mirror (article No. of JCR-30 W, manufactured by Iwasaki Electric Co., Ltd.) built-in were used as the light sources. The light sources were arranged so that the rod ends were located at respective focus points of the light sources.

First, the illuminance at O point located at a distance 1 m directly below the central part of the rod (O point illuminance) was measured using an illuminometer (article No. of T-1H, manufactured by Minolta Co., Ltd.). The illuminance was 148 [1x]. The distribution of the illuminance was measured by measuring illuminances at predetermined points in the horizontal plane including O point. The illuminances at points 10, 20, 30, 40, 50 and 60 cm apart from O point along the longitudinal direction of the rod were 146, 143, 136, 134, 113 and 109 [1x] (illuminances obtained on the right point and on the left point which were equally apart from 0 point being averaged), respectively. Moreover, the illuminances at points 10, 20 and 30 cm apart from 0 point along the transverse direction of the rod were 137, 108 and 79 [1×] (illuminances obtained on the right point and on the left point which were equally apart from O point being averaged), respectively.

Furthermore, the average value of the illuminances of the following four pints was 106 [1×]: two points 50 cm apart from O point along the longitudinal direction on the right, one of them 10 cm apart from O point along the transverse direction on the front side and the other one 10 cm apart from O point along the transverse direction on the back side; two points 50 cm apart from O point along the longitudinal direction on the left, one of them 10 cm apart from O point along the transverse direction on the front side and the other one 10 cm apart from O point along the transverse direction on the back side. The results show that the illuminance of the illuminator using the light-illuminating rod of the present example was at least 100 [1×] on a rectangular plane defined by the four points mentioned above, and that the illuminator, therefore, could illuminate with uniform and high illuminance.

Table 1 shown below summarizes such physical properties of the components of light-illuminating rods as the evaluation results of the adhesion and flexibility of diffusible films, the measured values of O point illuminance and the sensitive adhesive contained 42% by weight of an acrylic adhesive polymer (as a solid component concentration), and the acrylic adhesive polymer had a refractive index of 1.47 and a storage modulus of $5.48\times10^5$ dyne/cm$^2$. The ratio by weight of the diffusible reflective particles (D) to the light-transmittable polymer (P=dispersible polymer+adhesive polymer) (D:P) of the paint was 100:210.

The treated surface of a silicone-treated release PET film was coated with the paint using a knife coater, and the coating film was dried at 65° C. in an oven f or 60 minutes to form an adhesive film for forming a diffusible film of transfer type.

Using the adhesive film of transfer type thus obtained, two types of light-illuminating rods (with or without a FEP clad covering) were formed in the same manner as in Example 1. Using the two types of the light-illuminating rods, the adhesion and flexibility of the diffusible film were evaluated, and the illuminance was measured, in the same manner as in Example 1. Table 1 shown below lists the results thus obtained and the physical properties.

EXAMPLES 3 to 5

An adhesive film fox forming a diffusible film of transfer type was formed in the same manner as in Example 2 except that Predispersion A was used in an increased amount of 9.3 parts by weight. Adhesive films in a tape form were then prepared having a slit width of 2 mm (Example 3), 4 mm (Example 4) or 6 mm (Example 5). Two types of light-illuminating rods (with or without a clad covering) were formed in the same manner as in Example 1. Evaluations of the adhesion and flexibility of the diffusible films and measurements of the illuminance were made on the light-illuminating rods in the same manner as in Example 1. Table 1 shown below lists the results thus obtained and the physical properties.

EXAMPLE 6

An adhesive film for forming diffusible films of transfer type was formed in the same manner as in Example 2 except that a paint prepared as described below was used and that the coating film was dried at 100° C. The paint was prepared from 5.3 parts by weight of an emulsion acrylic polymer [a pressure-sensitive adhesive (article No. of AE943, manufactured by Nippon Latex Kako K.K.), an emulsion having a solid component concentration of 53% by weight being used in an amount of 10 parts by weight] as the light-transmittable polymer and 0.28 part by weight of acryl-styrene copolymer hollow particles [a hollow fine sphere polymer (trade name of Ropaque OP-62, manufactured by Rom and Haas), an emulsion having a solid component concentration of 37.5% by weight being used in an amount of 0.75 part by weight] as the light diffusible reflective particles. The adhesive film had a thickness of 70 µm after drying. The emulsion acrylic polymer had a refractive index of 1.47 and a storage modulus of $1.37\times10^6$ dyne/cm$^2$. The copolymer hollow particles had an outer diameter of 0.4 µm, an inner diameter of 0.3 µm, and refractive indexes of 1.5 (crust material) and 1.0 (inner pore (air)).

Using the adhesive film of transfer type thus obtained, two types of light-illuminating rods (with or without a FEP clad covering) were formed in the same manner as in Example 1. Using the two types of the light-illuminating rods, the adhesion and flexibility of the diffusible film were evaluated and the illuminance was measured, in the same manner as in Example 1. Table 1 shown below lists the results thus obtained and the physical properties.

EXAMPLE 7

Two types of light-illuminating rods (with or without a clad covering) were formed in the same manner as in Example 1 except that 0.05 part by-weight of 1,4-butanediol diacrylate (BDA) was added as a crosslinking agent to the paint for forming a dispersible film having prepared in Example 1. Using the light-illuminating rods, the adhesion and flexibility of the diffusible film were evaluated and the illuminance was measured, in the same manner as in Example 1. Table 1 shown below lists the results thus obtained and the physical properties.

EXAMPLE 8

In the present Example, a light-illuminating rod having a rod member and a diffusible film which was formed by closely bonding a coating film comprising a light-transmittable polymer and light-diffusible reflective particles dispersed therein to the outer periphery of the rod member through an intermediate light-transmittable adhesive was prepared as described below.

Predispersion B was prepared in the same manner as in the preparation of Predispersion A in Example 2 except that titanium oxide powder (article No. of CR-90, manufactured by Ishihara Sangyo Kaisha Ltd.) was used as titanium oxide. The titanium oxide (CR-90) had an average particle size of about 0.20 to 0.35 µm and a refractive index of 2.6.

Subsequently, the treated surface of a silicone-treated release PET film having a thickness of 50 µm was coated with Predispersion B using a knife coater, and the coating film was dried at 65° C. in an oven for 10 minutes. The coating film had a thickness of about 10 µm. The ratio by weight of the light-diffusible reflective particles (D) to the light-transmittable polymer (P) (D:P) was 100:10. The dried coating film was coated with the pressure-sensitive adhesive (article No. of M-300, manufactured by Toa Gosei Co., Ltd.) used in Example 2, and dried at 65° C. in an oven for 10 minutes to form a light-transmittable adhesive layer having a thickness of 15 µm. An adhesive film for forming a diffusible film of transfer type with double layers (a layer containing light-diffusible reflective particles+a layer of a light-transmittable adhesive) was obtained.

Using the adhesive film of transfer type thus obtained, two types of light-illuminating rods (with or without a FEP clad covering) were formed in the same manner as in Example 1. Using the light-illuminating rods, the adhesion and flexibility of the diffusible films were evaluated and the illuminance was measured, in the same manner as in Example 1. Table 1 shown below lists the results thus obtained and the physical properties.

EXAMPLE 9

Two types of light-illuminating rods (with or without a FEP clad covering) were formed in the same manner as in Example 8 except that the thickness of the layer containing light diffusible reflective particles was changed to 20 µm. Using the light-illuminating rods, the adhesion and flexibility of the diffusible films were evaluated and the illuminance was measured, in the same manner as in Example 1. Table 1 shown below lists the results thus obtained and the physical properties.

EXAMPLE 10

Two types of light-illuminating rods (with-or without a FEP clad covering) were formed in the same manner as in Example 8 except that the layer containing light diffusible reflective particles was formed from a paint prepared from 5.3 parts by weight of an emulsion acrylic polymer [pressure-sensitive adhesive (article No. of AE943, manufactured by Nippon Latex Kako K.K.)] as the light-transmittable polymer and 5.3 parts by weight of acryl-styrene copolymer hollow particles [hollow fine spheres of polymer (trade name of Ropaque OP-62, manufactured by Rom and Haas)] as the light diffusible reflective particles. Using the light-illuminating rods, the adhesion and flexibility of the diffusible films were evaluated and the illuminance was measured, in the same manner as in Example 1. Table 1 shown below lists the results thus obtained and the physical properties.

EXAMPLE 11

Two types of light-illuminating rods (with or without a FEP clad covering) were formed in the same manner as in Example 10 except that the light-transmittable adhesive was prepared by UV-ray polymerizing a monomer mixture of monomer components consisting of 60 parts by weight of 2EHA, 40 parts by weight of PEA and 0.1 part by weight of BDA and 0.2 part by weight of a photopolymerization initiator (trade name of Darocure 1173, manufactured by Ciba Geigy). Using the light-illuminating rods, the adhesion and flexibility of the diffusible films were evaluated and the illuminance was measured, in the same manner as in Example 1. Table 1 shown below lists the results thus obtained and the physical properties. In addition, the UV-ray polymerization was conducted in the same manner as in the formation of the adhesive film of transfer type in Example

EXAMPLE 12

Two types of light-illuminating rods (with or without a FEP clad covering) were formed in the same manner as in Example 11 except that the light-transmittable adhesive was prepared by UV-ray polymerizing a monomer mixture of 100 parts by weight of trifluoroethyl acrylate (trade name Viscoat 3F, manufactured by Osaka Organic Chemical industry Ltd.) and 0.2 part by weight of a photopolymerization initiator (trade name of Darocure 1173, manufactured by Ciba Geigy). Using the light-illuminating rods, the adhesion and flexibility of the diffusible films were evaluated and the illuminance was measured, in the same manner as in Example 1. Table 1 shown below lists the results thus obtained and the physical properties.

EXAMPLE 13

Two types of light-illuminating rods (with or without a FEP clad covering) were formed in the same manner as in Example 8 except that the layer containing light diffusible reflective particles was prepared from a mixture of 4.4 parts by weight of Predispersion A and a solution obtained by dissolving 1 part by weight of a fluoro elastomer [(article No. of THV 200P, manufactured by Sumitomo 3M Ltd.) having a refractive index of 1.36 and a storage modulus of $1.73 \times 10^8$ dyne/cm$^2$] as one of light-transmittable polymers in 4 parts by weight of methyl ethyl ketone. Using the light-illuminating rods, the adhesion and flexibility of the diffusible films were evaluated and the illuminance was measured, in the same manner as in Example 1. Table 1 shown below lists the results thus obtained and the physical properties.

EXAMPLE 14

Two types of light-illuminating rods (with or without a FEP clad covering) were formed in the same manner as in Example 8 except that the layer containing light diffusible reflective particles was prepared by coating with a dispersion comprising 100 parts by weight of silica particles as light diffusible reflective particles and 100 parts by weight of PEA as a monomer component to become a light-transmittable polymer after polymerization, and UV-curing. Using the light-illuminating rods, the adhesion and flexibility of the diffusible films were evaluated and the illuminance was measured, in the same manner as in Example 1. Table 1 shown below lists the results thus obtained and the physical properties. In addition, UV-curing was conducted in the same manner as in the formation of the adhesive film of transfer type in Example 1. The silica particles were prepared-by drying silica sol (article No. of 5, manufactured by Nissan Chemical Industries Ltd.), and grinding the dried product with an agate mortar. The silica particles had a particle size of about 1 µm and a refractive index of 1.46.

EXAMPLE 15

Two types of light-illuminating rods (with or without a FEP clad covering) were formed in the same manner as in Example 1 except that the diffusible film was formed by directly coating the outer periphery of a rod member with Predispersion B to form a coating layer 4 mm wide and drying the coating layer at room temperature. Using the light-illuminating rods, the adhesion and flexibility of the diffusible films were evaluated and the illuminance was measured, in the same manner as in Example 1. Table 1 shown below lists the results thus obtained and the physical properties.

COMPARATIVE EXAMPLE 2

Two types of light-illuminating rods (with or without a FEP clad covering) were formed in the same manner as in Example 15 except that, for comparison, the paint was prepared by mixing 11 parts by weight of Predispersion B mentioned above and 5 parts by weight of a polystyrene (manufactured by Aldrich, Mw=45.00, a refractive index= 1.58, storage modulus=$\times 10^{10}$ dyne/cm$^2$). The light transmittable polymer (dispersible polymer+polystyrene) had a refractive index of 1.58, a storage modulus of $1 \times 10^{10}$ dyne/cm$^2$ and a film thickness of 50 µm.

Although the illuminance was sufficient (O point illuminance=122) in the light-illuminating rods in Comparative Example 2, the adhesion and flexibility of the diffusible films were judged to be no good.

COMPARATIVE EXAMPLE 3

Two types of light-illuminating rods (with or without a FEP clad covering) were formed in the same manner as in Example 8 except that, for comparison, the layer containing light diffusible reflective particles was formed from the paint used in Comparative Example 2. Although-the illuminance was sufficient. (O point illumination=102) in the light-illuminating rods in Comparative Example 3, the adhesion and flexibility of the diffusible films were judged to be no good.

TABLE 1

| Ex. | Width of diffusible film (mm) | Refractive index of particles[A] | Wt. Parts of polymer[B] | Refractive index of polymer[C] | Storage modulus of polymer[D] | Thickness of diffusible film (μm) | Refractive index of adhesive (%) | O point illuminance [lx] | Evaluation of adhesion and flexibility |
|---|---|---|---|---|---|---|---|---|---|
| 1 | 4 | 2.6 | 200 | 1.49 | $7.00 \times 10^5$ | 30 | — | 148 | good |
| 2 | 4 | 2.6 | 210 | 1.47 | $5.65 \times 10^5$ | 45 | — | 92 | good |
| 3 | 2 | 2.6 | 110 | 1.47 | $5.93 \times 10^5$ | 45 | — | 91 | good |
| 4 | 4 | 2.6 | 110 | 1.47 | $5.93 \times 10^5$ | 45 | — | 127 | good |
| 5 | 6 | 2.6 | 110 | 1.47 | $5.93 \times 10^5$ | 45 | — | 106 | good |
| 6 | 4 | 1.5/1.0[F] | 1900 | 1.47 | $1.37 \times 10^6$ | 70 | — | 83 | good |
| 7 | 4 | 2.6 | 200 | 1.49 | $7.44 \times 10^5$ | 45 | — | 141 | good |
| 8 | 4 | 2.6 | 10 | 1.51 | $1.50 \times 10^7$ | 10/15[G] | 1.47 | 78 | good |
| 9 | 4 | 2.6 | 10 | 1.51 | $1.50 \times 10^7$ | 20/15[G] | 1.47 | 104 | good |
| 10 | 4 | 1.5/1.0[F] | 100 | 1.47 | $1.37 \times 10^6$ | 25/15[G] | 1.47 | 109 | good |
| 11 | 4 | 1.5/1.0[F] | 100 | 1.47 | $1.37 \times 10^6$ | 25/15[G] | 1.50 | 136 | good |
| 12 | 4 | 1.5/1.0[F] | 100 | 1.47 | $1.37 \times 10^6$ | 25/15[G] | 1.40 | 80 | good |
| 13 | 4 | 2.0 | 60 | 1.39 | $1.00 \times 10^8$ | 15/15[G] | 1.47 | 107 | good |
| 14 | 4 | 1.46 | 100 | 1.56 | $2.69 \times 10^8$ | 110/15[G] | 1.47 | 66 | good |
| 15 | 4 | 2.6 | 10 | 1.51 | $1.50 \times 10^7$ | 50 | — | 131 | good |

Note:
[A]Refractive index of light diffusable reflective particles
[B]Parts by weight of a light-transmittable polymer based on 100 parts by weight of light diffusible reflective particles
[C]Refractive index of a light-transmittable polymer
[D]Storage modulus (dyne/cm$^2$) of a light-transmittable polymer
[E]Refractive index of a light-transmittable adhesive
[F]Refractive index of hollow particles; refractive index of a crust material/refractive index of an inner pore (air)
[G]Thickness of a layer containing light diffusible reflective particles/thickness of a layer of a light-transmittable adhesive Effect of Invention The present invention may not only provide a light-illuminating rod particularly capable of being advantageously used as a linear illuminator but also improve the adhesion and flexibility of a diffusion film provided on the outer periphery of-the rod member. As a result, the present invention makes it possible to handle the rod while the rod is being deflected or fixedly install the rod while the rod is being bent. Furthermore, since the light-illuminating rod of the present invention can be utilized while its light source is made apart, it may be utilized as cool light illumination.

What is claimed is:

1. A light-illuminating rod comprising (a) a flexible rod member formed from a light-piping plastic material and (b) a light diffusible reflective film which is fixedly bonded to part of the outer periphery of the rod member along the longitudinal direction thereof and which comprises (i) a light-transmittable polymer and (ii) light diffusible reflective particles dispersed in the polymer, said light transmittable polymer of the light diffusible reflective film having a storage modulus of $1.0 \times 10^4$ to $1.0 \times 10^8$ dyne/cm$^2$ as measured by a viscoelastic spectrometer and said light transmittable polymer contains from 2 to 90% by weight of a dispersible polymer having hydrophilic functional groups within the molecule based on the total amount of the light-transmittable polymer, and said light diffusible reflective particles contain from 10 to 100% by weight of an inorganic material based on the amount of light diffusible reflective particles.

2. The light-illuminating rod as claimed in claim 1, wherein said light-transmittable polymer contains from 10 to 100% by weight of an adhesive polymer based on the total amount of said light-transmittable polymer.

* * * * *